Sept. 4, 1962    F. H. TENNIS    3,052,218
HYDRAULIC CONTROL VALVE
Filed Dec. 12, 1960    5 Sheets-Sheet 1

Sept. 4, 1962 F. H. TENNIS 3,052,218
HYDRAULIC CONTROL VALVE
Filed Dec. 12, 1960 5 Sheets-Sheet 2

Fig. 2.

INVENTOR
Francis H. Tennis
By
ATTORNEY

Sept. 4, 1962 F. H. TENNIS 3,052,218
HYDRAULIC CONTROL VALVE
Filed Dec. 12, 1960 5 Sheets-Sheet 4

Fig. 5.

Inventor
Francis H. Tennis
By Ira Milton Jones
Attorney

3,052,218
HYDRAULIC CONTROL VALVE

Francis H. Tennis, Milwaukee, Wis., assignor to Hydraulic Unit Specialties Company, Pewaukee, Wis., a corporation of Wisconsin
Filed Dec. 12, 1960, Ser. No. 75,653
5 Claims. (Cl. 121—46.5)

This invention relates to control valves of the types disclosed in United States Patent No. 2,873,762 to Francis H. Tennis, which are employed to govern the operation of fluid pressure operated mechanisms such as hydraulic cylinders or other hydraulic equipment; and the invention refers more particularly to a control valve having a body with pairs of service passages that are adapted to be connected with different hydraulic mechanisms under the control of a spool or valve element for each mechanism to be controlled common to the pair of service passages for that mechanism, each spool being slidable in a bore in the body from a neutral position to one or the other of a pair of operating positions.

This application is a continuation in part of my application, Serial No. 44,323, filed July 21, 1960, now abandoned.

The control valve of the aforesaid patent is capable of adaptation, by slight modifications of its body, to provide for either parallel operation, in which two or more hydraulic mechanisms connected with the valve can be placed thereby in full communication with the outlet of a pump at the same time, or for series-parallel operation in which only one of several hydraulic mechanisms connected with the valve can be fully communicated with the outlet of the pump at any one time.

In addition, the valve of the aforesaid patent is adaptable for use with both single acting and double acting mechanisms, or combinations of such mechanisms, merely by substitution of one type of valve spool for another and without the requirement for any modification of the valve body.

Thus the valve disclosed in Patent No. 2,873,762 provides a versatile basic unit, but heretofore it was not known how to adapt it for one additional mode of operation which is desirable for many types of applications, namely series operation, in which two (or more) hydraulic mechanisms may be operated simultaneously, with the return or exhaust fluid from one mechanism being directed by the valve to the pressure side of another hydraulic mechanism, to effect actuation of the other mechanism. Series operation of hydraulic motors is desirable in many applications because it affords the possibility of achieving substantial power economy. This is particularly true in cases where one of two series-operated hydraulic mechanisms is sometimes driven by its load, as during lowering of a boom or the like, and the load force thus pressurizes the fluid exhausting from the hydraulic motor connected with it, so that such exhaust fluid is available for the simultaneous actuation of another hydraulic mechanism. If the control valve can provide for the direction of such pressurized return fluid to another hydraulic motor, rather than having it return to a fluid reservoir, the pump may at times be called upon to provide only a small fraction of the necessary pressure for actuation of the second motor.

With the foregoing in mind, it is an object of the present invention to provide means for adapting a valve body like that of the aforesaid Patent No. 2,873,762 for either parallel, series-parallel, or series operation, or for any desired combination of such modes of operation, without necessitating any but very minor and inexpensive changes in the valve body.

More specifically, it is an object of this invention to provide simple and inexpensive means for adapting the valve body of the aforesaid patent for series operation, comprising a special spool which is directly interchangeable with spools that adapt the valve for parallel or series-parallel operation, so that a control unit having such a body can be arranged to provide a group of valves comprising any combination or permutation of series valves, parallel valves, or series-parallel valves, or can consist entirely of any one of said types of valves, depending upon the type of spool or spools used and other minor alterations.

It follows that it is another object of this invention to provide a spool for a valve body of the character described which is interchangeable with spools of the type that have heretofore been used in such a valve body to provide parallel or series-parallel operation, in order to adapt the valve for series operation.

The body of the valve of the aforesaid patent has a through passage which extends from an inlet to an outlet in the body and which is intersected by a plurality of bores in each of which a spool is slidable, a pair of service passages associated with and governed by each spool and opening to the bore therefor at locations spaced apart axially of the bore, and all of which service passages lead to motor ports opening to the exterior of the body, supply passage means to conduct pressure fluid fed into the inlet to either service passage of each bore, and exhaust passage means communicable with each service passage through its associated bore under the control of the spool therein. When a spool in one of the bores of the valve of said patent is moved to either of its operating positions, it directs pressure fluid to one of its associated service passages, and effects communication of the other of its associated service passages with the exhaust passage means to direct return fluid from said other service passage to the exhaust passage means. Hence either service passage for any one bore may at times conduct working fluid from the valve to the motor governed by the spool in said bore, while the other service passage receives the return fluid from the motor.

In series operation, of course, return fluid cannot be emptied into the exhaust passage, but must be made available to one or the other of the service passages associated with another valve spool and which are under the control of said other spool.

Hence it is a specific object of this invention to provide a valve spool which can be installed in a valve body of the type described, and which, when in an operative position causes fluid returning to one of its service passages from a hydraulic mechanism controlled by the spool to bypass the exhaust passage in the body and to be instead directed to a portion of the through passage which is intermediate said spool and an adjacent downstream spool, whence it can be further diverted by said downstream spool through suitable supply passage means to a service passage controlled by the downstream spool for actuation of a hydraulic mechanism governed thereby.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of physical embodiments of the invention constructed according to the best modes so far devised for the practical application of the principles thereof, and in which.

Referring now more particularly to the accompanying drawings, in which like reference characters have been applied to like parts throughout the several views, the numeral 5 designates generally the body for a control valve of this invention, which is preferably formed as a casting. In more or less conventional fashion, the body is provided with a through passage generally designated 6, which extends vertically through the body from the top to the bottom thereof and communicates an inlet port 7 at the top of the body with an outlet port 9 in its bottom.

By way of illustration, the body is shown provided with six axially slidable valve spools which, reading from the top to the bottom, are numbered 10, 11, 12, 13, 14 and 15. Each of the spools is received in a bore 16 in the valve body which crosswise intersects the through passage 6, and all of the bores are arranged with their axes parallel and is spaced apart relation.

An end portion 17 of each spool projects from one side of the body to provide for axial sliding actuation of the spool in its bore, as by means of an actuating lever, not shown. At its other end the spool is connected with a spring powered centering mechanism generally designated 18, the purpose of which is to normally hold the spool in a neutral position at which it leaves the through passage open at its junction with the bore. When all of the spools are in their neutral positions, pressure fluid which may be supplied to the inlet 7, as from a pump, is free to flow directly through the valve body to the outlet 9.

In the embodiment of the invention illustrated in FIGURES 1–4, as will be described hereinafter, the two upper spools 10 and 11 have been shown, by way of example, as adapted for parallel operation of two hydraulic systems governed thereby; the next three spools 12, 13 and 14 have been shown as special series- type spools which adapt the control valve of this invention for series operation of the hydraulic mechanisms (not shown) which they control; while the bottom spool 15 has been shown as a conventional spool, providing a valve element of what is sometimes referred to as the series-parallel type. Also, as is customary, a relief valve mechanism 20 is provided in the valve of this invention, being received in a bore 21 therein parallel to the bores in which the valve spools are received, located a distance above the upper-most spool 10 but beneath the inlet 7.

Following conventional practice, the through passage 6 is comprised of a number of upright communicated cored sections which are offset laterally with respect to one another in the direction of the axes of the various bores in which the valve spools are received, the sections being alternately offset first in one of said directions and then in the other. Thus, for example, the through passage includes an inlet section 23, which extends downwardly from the inlet port 7 to the bore 16 in which the top valve spool 10 is received; a first offset section 24 which spans the bores in which the valve spools 10 and 11 are received and is communicated with them, disposed in laterally offset relation to the lower end of the inlet section 23 but communicated with the inlet section through a short section 16' of the uppermost bore; a second intermediate section 25 which spans the bores in which the valve spools 11 and 12 are received and communicates the same, and which is likewise communicated with the lower end of the first intermediate section 24 through a short central portion 16' of the bore in which the spool 11 operates. The remaining sections 26, 27 and 28 are similarly disposed in laterally staggered relationship to one another, so that each section communicates with the axially adjacent sections above and below it through short central portions 16' of the spool bores to which it opens, and so that sections 25 and 27 are vertically in line with inlet section 23 but are offset with respect to vertically aligned sections 24, 26 and 28. A final or outlet section 29, in vertical alignment with the inlet section 23, communicates the bore in which the valve spool 15 operates with the outlet 9 of the valve body.

Each of the valve spools illustrated is provided with a centrally located circumferential groove 30 which, when the valve spool is in its neutral position, has its opposite ends disposed in the axially offset through passage sections common to the bore in which the spool is received. Therefore pressure fluid entering the inlet 7 is free to flow directly through the through passage to the outlet 9 as long as the valve spools remain in their neutral positions in which they are shown, and in which they are held by the centering mechanisms 18.

However, each valve spool is shiftable axially from its neutral position to each of two operating positions at both of which it blocks the through passage at its junction with the bore in which the spool is received. This follows by reason of the fact that in either operating position of the spool, one of the lands at either side of its groove 30 enters and closes the short medial section 16' of its bore, to thus cause pressure fluid supplied to the inlet 7 of the valve body to be diverted to one or the other of a pair of service passages 32 and 33 which are associated with its bore. As shown best in FIGURES 3 and 4, these service passages communicate with their respective bores at zones spaced axially of the bores from one another and from the through passage 6, and each of the service passages leads to a motor port P opening to the exterior of the valve body.

Figure 1:
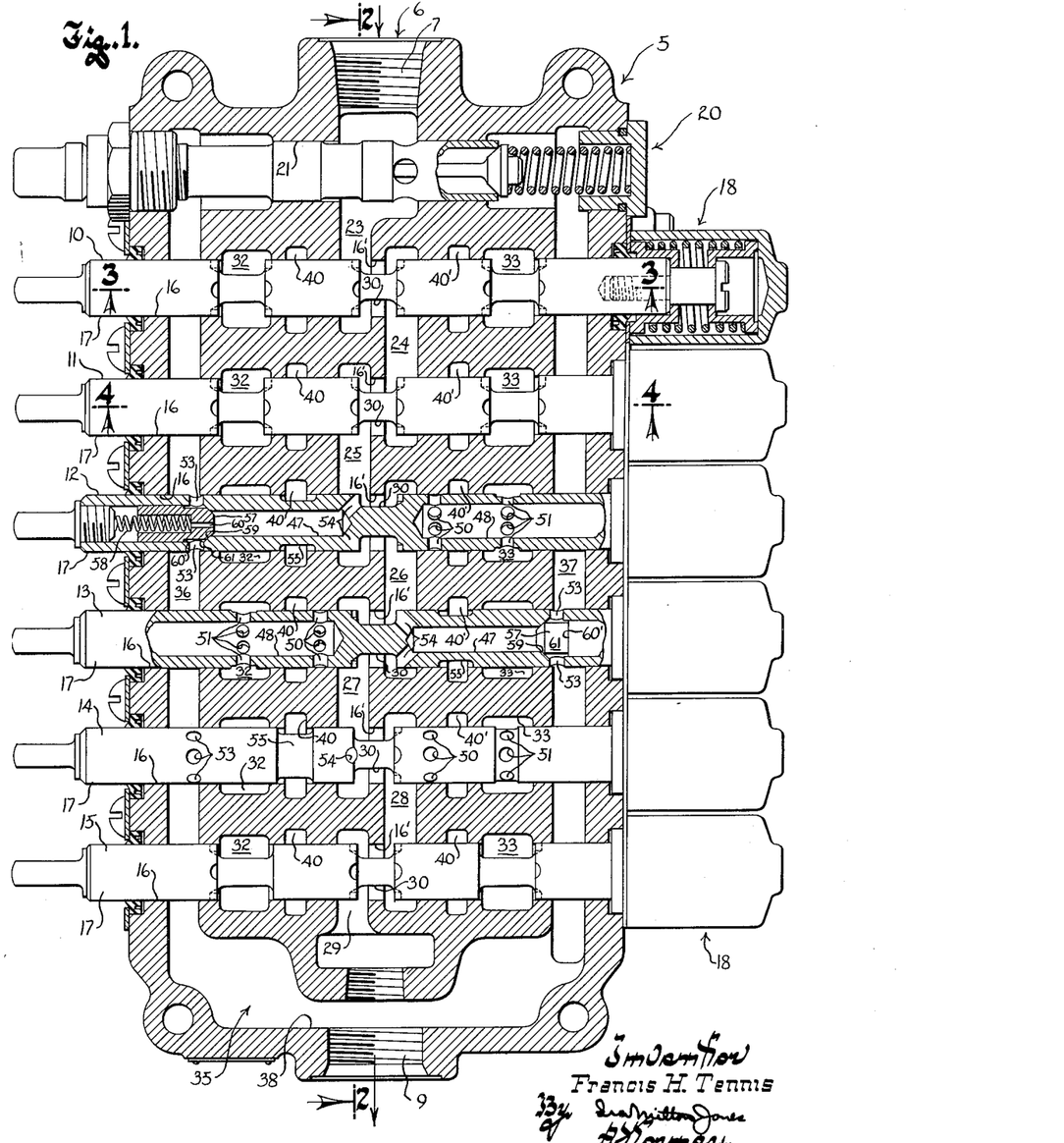
FIGURE 1 is a view of a hydraulic control valve embodying the principles of this invention, shown partly in front elevation and partly in section.
Figure 2:
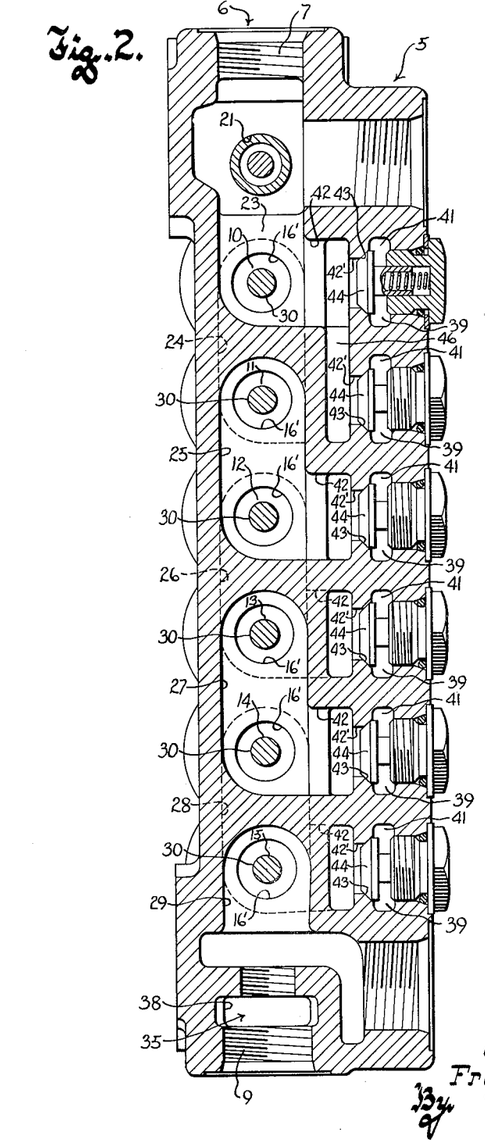
FIGURE 2 is a cross sectional view taken on the plane of the line 2—2 in FIGURE 1.

While not essential, it is nevertheless highly advantageous from the standpoint of ease of manufacture and the adaptability of the valve body for various types of service requirements, that all of the passages in the valve body be more or less symmetrically arranged, in the manner shown in FIGURE 1. Thus the through passage 6 extends vertically downwardly through the center of the valve body, more or less equi-distant from the opposite sides of the body, and the two service passages associated with each of the valve spool bores communicate with their associated bore at zones which are spaced equal distances to opposite sides of the junction between the through passage and their bore.

Since a valve of this invention has a body which is adapted for any of the three types of service mentioned hereinbefore, it is important to provide exhaust passage means 35 which in the present case is shown comprised of a pair of vertical branches 36 and 37, spaced axially of the bores outwardly from the junctions of the service passages with their respective bores, and likewise symmetrically arranged with respect to the through passage 6. These vertical branches of the exhaust passage means, of course, intersect all of the spool bores. In the cases of the bores in which are received the two uppermost spools 10 and 11 and the bottom spool 15, the exhaust passage means are communicable with the service passages of those spools, through their associated bores, under the control of the valve spools in said bores. This, of course, is typical of the more or less conventional valves of the aforesaid Tennis Patent No. 2,873,762.

The two branches 36 and 37 of the exhaust passage communicate with a common transverse branch 38 below the lowermost spool 15 and in which transverse branch has direct communication with the outlet 9.

The parallel spools 10 and 11, and the bottom spool 15, are of the so-called "double acting" type, that is, each is shiftable in opposite directions out of its neutral position to a pair of operating positions at either of which it directs pressure fluid into one of its service passages and communicates the other service passage with an adjacent branch of the exhaust passage means.

It will be understood that the spools 10 and 11, or either of them, might also be used for the control of single acting cylinders, in which event the motor port with which one of the service pasages communicates would be plugged. In that case the spool associated with the plugged port would be provided with a substantially wider central groove than that shown (similar to that in the single-acting spool illustrated in FIGURE 3 of the aforesaid Patent No. 2,873,762), whereby the through passage would be left open at times when fluid was returning from the single acting hydraulic mechanism, so that pressure fluid could flow directly to the outlet 9, thus avoiding the necessity for the pump to work against the relief valve.

Each of the three series spools 12, 13 and 14 is of the so-called double acting type, and is shiftable in opposite directions to each of a pair of operating positions, but in this case each spool, when in either of its operating positions, directs pressure fluid to one of its service passages and causes return fluid to be conducted from the other of its service passages to a portion of the through passage intermediate said spool and an adjacent downstream spool, where such return fluid is available for transmission to another hydraulic mechanism governed by said downstream spool.

Figure 3:
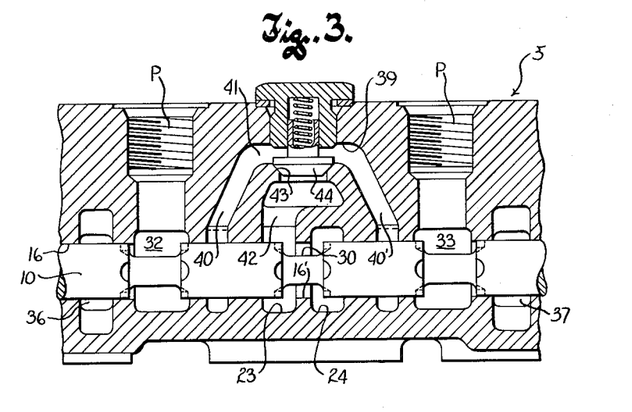
FIGURE 3 is a sectional view taken on the plane of the line 3—3 in FIGURE 1.
Figure 4:
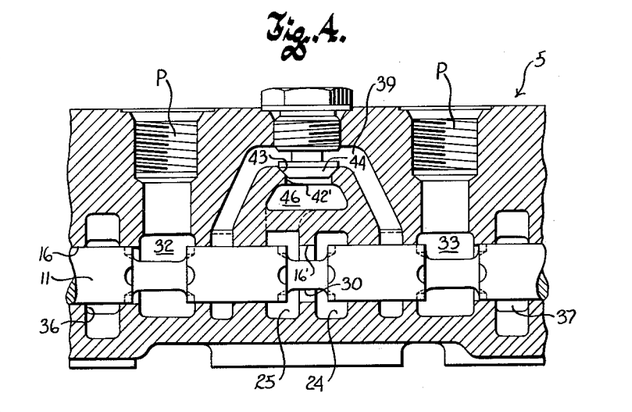
FIGURE 4 is a sectional view taken on the plane of the line 4—4 in FIGURE 1.

When the top spool 10 is in one of its operating positions, pressure fluid is brought to its bore, for direction by the spool to one or the other of the service passages 32 and 33, by feeder passage means which includes the inlet section 23 of the through pasage and a U-shaped bridging passage 39 shown best in FIGURE 3. The opposite legs 40 and 40' of the bridging passage 39 extend toward the spool 10, at right angles to the spool and the through passage, and communicate with the bore 16 in which the spool 10 operates at zones spaced equal distances lengthwise of the bore, to opposite sides of the through passage, but intermediate each service passage and the section of the through passage adjacent thereto. The ends of the legs 40 and 40' which are remote from the bore are communicated by a bight portion 41 that extends generally lengthwise of the bore but is spaced a distance to one side thereof. The feeder passage means also includes a branch 42 which extends laterally from the through passage section 23, intermediate the legs 40 and 40' of the bridging passage and opens into the bight 41 through a bore 42' having a chamfer defining a seat 43 which is normally closed by a check valve 44.

The check valve 44 is unseated to communicate the inlet section 23 of the through passage with the U-shaped bridging passage 39 in consequence of the rise in fluid pressure in the feeder passage means resulting from blocking of the through passage by the spool 10 in either operating position thereof. At such a time, the opening of the check valve enables the entre U-shaped bridging passage 39 to be pressurized, thus making it possible for the spool 10 to direct pressure fluid from the inlet section 23 of the through passage to either one of its service passages 32 or 33, depending upon the direction in which the spool is shifted, and to communicate the other service passage with the branch of the exhaust pasage means adjacent thereto.

The second spool 11 of the pair of spools arranged for parallel operation is the same as the spool 10 and functions in exactly the same manner. It also has a bridging passage 39 that is supplied with pressure fluid from the inlet 7 of the valve body through a bore 42' which is normally closed by a check valve 44 and opens into the lower end of a short vertical feeder branch 46, seen best in FIGURE 2. At its upper end the vertical feeder branch 46 communicates with the lateral branch 42 of the feeder passage for the bridging passage of the first spool 10. By reason of this arrangement, pressure fluid is brought to the bridge and its legs 40 and 40' for the spool 11, even though the spool 10 is in an operating position in which it blocks flow of fluid to the through passage section 24 that is common to the spools 10 and 11. Hence, when both of the spools 10 and 11 are moved to operating positions, pressure fluid from the body inlet 7 is available to selected service passages of both spools and cannot bypass the spools 10 and 11 and travel to the outlet 9 of the valve body through that portion of the through passage which is downstream from the bore of the second spool 11.

From the description thus far, it will be apparent that the three spools 12, 13 and 14 which are arranged for series operation are rendered ineffective to control hydraulic mechanisms governed thereby except when both of the two parallel spools 10 and 11 are in their neutral positions.

As in the case of the parallel spools 10 and 11, a bridging passage 39 is provided for each of the series spools 12, 13 and 14, along with a bore 42' leading to the bridging passage and normally closed by a check valve 44. In this case, the portion of the through passage that intersects the bores for spools 12, 13 and 14 serve as a supply passage, and the bridging passage of each series of spool is supplied with pressure fluid from the lower end of the upstream branch of the through passage asosciated with that spool. Referring to spool 12 by way of example, a short lateral feeder branch 42 like that connecting with the inlet branch 23 of the through passage, is provided to communicate the lower end portion of through passage section 25 with the bore 42' leading to the bridge for spool 12. When the through passage section 25 is closed by spool 12, the resulting buildup in fluid pressure in the passage section 25 lifts the check valve 44 for said spool off of its seat, thus permitting pressure fluid to flow from through passage section 25, into the lateral feeder branch 42, the bore 42' and the bridge passage for spool 12, for direction by the spool to the selected service passage. Thus the spools 12, 13 and 14, like spools 10 and 11, when shifted out of their neutral positions shown in FIGURE 1, effect diversion of pressure fluid from the lower end portions of their respective through passage sections 25, 26 and 27 to either of their respective service passages 32—33; but unlike the two parallel spools above them, they do not communicate the other of their service passages with the exhaust passage means.

Instead, each of the series spools 12, 13 and 14 is so constructed that it effects the routing of return fluid to the upper end portion of the downstream section of the through passage which intersects its bore, so that such return fluid under pressure is made available to the bridging passage and one or the other of the service passages for a spool therebeneath upon shifting of the same out of neutral position. Specifically, each of the series spools 12, 13 and 14 is made with hollow end portions at opposite sides of the external groove 30, where the spool is solid, to provide axially elongated passages 47 and 48 which extend in opposite axial directions from the solid center section of the spool. In each of spools 12 and 14 the passage 47 is in the left portion of the spool and the pasage 48 is at the right, while in spool 13 this relationship is reversed because of the staggered disposition of the through passage sections.

A circumferentially arranged series of radial holes 50 in each of the series spools communicates the inner end of passage 48 with the bore in which the spool operates. In the case of each of spools 12 and 14 these holes 50 open to the bore 16 at a location which, in the neutral position of the spool, is substantially medially between the right hand leg 40' of the bridge passage and the upper end portion of the adjacent section of the through passage. A second circumferentially arranged series of radial holes 51 in each of series spools 12 and 14 communicates the passage 48 with the service passage 33 in all positions of the valve, opening substantially centrally to this service passage when the valve is in neutral position. Thus it will be seen that if either spool 12 or 14 is shifted out of its neutral position, to the right, to an operating position at which it closes the short bore 16' and blocks communication between its adjacent laterally off-set sections of the through passage, fluid pressure will build up in its upstream through passage section (25 or 27) and cause unseating of the check valve for said spool to allow pressure fluid to flow into the right hand leg 40' of the bridging passage with which the radial holes 50 then communicate. Through these holes 50 pressure fluid is conducted into the passage 48 for flow axially outwardly to the radial holes 51, whence the fluid issues to the service passage 33 for flow to a hydraulic mechanism governed by the spool.

Return fluid entering the service passage 32 from the hydraulic mechanism at such a time is led into the passage 47 in the opposite end portion of the spool through one or more radial holes 53 in the spool which are brought into register with the service passage 32 when the spool has been shifted to the right, to the operating position thereof described above. Such return fluid brought to the passage 47 flows toward the grooved or solid center section of the spool, and issues from the passage 47 through a plurality of obliquely angled holes 54 which open to the adjacent end of the groove 30 in the spool.

Since the through passage is closed by the land at the left extremity of the groove 30 in the operating position of the spool, just described, the return fluid is thus conducted into the upper portion of the downstream section of the through passage at the junction of the latter with the bore in which the spool operates. This, of course, makes pressure fluid available to the bridge of a spool that is beneath the one that is so operated, so that a second hydraulic mechanism may be operated by such lower spool upon shifting thereof in either direction out of its neutral position shown in FIGURE 1.

When either of the spools 12 or 14 is shifted to the left from its neutral position shown, to an operating position at which the land at the right hand end of the central groove 30 blocks the short section 16' of the bore in which the spool operates, a circumferential groove 55 in the exterior of the spool effects communication between the service passage 32 and the left leg 40 of the bridge for the spool, thus causing pressure fluid to be diverted from the upstream section of the through passage to the service passage 32 for flow to a hydraulic mechanism controlled by the spool. At the same time the radial holes 50 will be in communication with the branch of the through passage (26 or 28) downstream from the actuated spool, so that fluid returning from the mechanism into the other service passage 33, and which is led into the passage 48 through the holes 51, is discharged into the downstream section of the through passage to be made available to the spool or spools therebeneath.

The series spools 12, 13 and 14 have been shown incorporated in a more or less conventional valve body having an exhaust passage comprised of a pair of upright branches 36 and 37, located axially outwardly of, but substantially close to, the service passages 32 and 33. These exhaust passage branches, of course, are necessary in any valve having spools arranged for parallel, or conventional operation, as described in connection with the parallel spools 10 and 11. With that arrangement, it is unavoidable that the radial holes 53 of any series spool will be nearly fully in register with one or the other branch of the exhaust passage when the spool is either in its neutral position shown, or in the operating position in which the holes 53 are shifted away from the through passage. If the passage 47 in the spool were permitted to communicate with the exhaust passage through the holes 53 in said last-named operating position of the spool, it would be impossible for the spool to divert fluid under full pressure into the service passage nearest the holes 53, by reason of the fact that pressure fluid would tend to bypass the bridge for the spool and flow into the holes 54, outwardly through the passage 47 and through the holes 53 into the adjacent branch of the exhaust passage. Such undesired discharge of fluid into the exhaust passage would be avoided if the exhaust passage branches 36 and 37 were located far enough away from the junctions between the service passages and the bores in which the series spools operate so that the radial holes 53 would never be brought into register with the exhaust passage means in any position of the spool.

But where the exhaust passage branches are not so located, but are positioned as shown in the drawings, it is necessary to provide means which in effect closes off the radial holes 53 in the one operating position of the spool just described. As shown, such means comprises a check valve plunger 57 which is axially slidably received in a chamber provided by a counterbored outer end portion of the passage 47 and which is biased by a spring 58 into engagement with a seat 59 in the passage, located a short distance axially inwardly of the radial holes 53 at the bottom of the counterbore. Normally, the engagement of the plunger with the seat 59 blocks off communication between the passage 47 and the radial holes 53, and the arrangement is such that the check valve can be lifted off of its seat to establish communication between the holes 53 and the passage 47 only when the holes 53 are in register with a service passage, during a time when fluid exhausting from a hydraulic mechanism controlled by the spool is returning into the said service passage. The head of the check valve plunger has a small diameter axial passage 60 therethrough which communicates the passage 47 in front of the plunger with the space behind the head of the plunger. In that operating position of each series spool at which its holes 53 are in register with an exhaust passage branch, therefore, pressure fluid entering the axial passage 47 in the spool through the holes 54 can flow to the space behind the plunger and thereby effect a balancing of pressures at opposite sides of the head of the plunger by which the spring 58 is able to hold the plunger seated and thereby prevent fluid under pressure from escaping through the holes 53 into the adjacent exhaust passage branch. Consequently such fluid can be diverted by the spool from the adjacent upstream through passage section and the bridge communicated therewith into the service passage adjacent to holes 53, without loss of pressure.

However, when the spool is shifted to the opposite operating position, in which the holes 53 register with their adjacent service passage to which return fluid is being conducted, such return fluid under pressure enters the holes 53 and exerts force upon a shoulder 60' on the valve plunger which faces forwardly and is located a slight axial distance outwardly from the radial holes 53. That force is relied upon to effect unseating of the check valve plunger and the establishment of communication between the adjacent service passage and the passage 47 in the spool. The shoulder 60' is readily provided by a reduced diameter portion 61 on the front of the valve plunger head.

It will now be apparent that each of the spools 12, 13 or 14, when in either of its operating positions, effects diversion of pressure fluid from its upstream section of the through passage to one of its service passages, and effects the delivery of return fluid entering the other service passage to its downstream section of the through passage, so as to make pressure fluid available for the bridge and service passages of the lower spool or spools upon shifting thereof to one or the other of its or their operating positions.

The series spools 12 and 14 are identical to one another in all respects, as specifically described above, and the series spool 13, which is located between them, is like them except that its arrangement of axial passages and radial holes is reversed relative to those of spools 12 and 14. In other words, the axial passage 47 and the radial holes 53 and 54 which communicate therewith are located in the right hand portion of the spool 13, while the axial passage 48 and its radial holes 50 and 51 are located in the left hand end portion of the spool 13. This reversal of the orientation of the axial passages in the spool 13 is necessitated by reason of the staggered relationship of the through passage sections.

FIGURE 3, which denotes the construction of the valve at a location along the axis of the spool 10, also denotes the construction of the valve at locations taken along the axes of the spools 12, 13, 14 and 15, except that communication between the bridges of the latter spools and the through passage will alternate first from one side of the central axis of the through passage to the other, in correspondence with the staggered relationship of the through passage sections.

It will also be appreciated from FIGURE 1 that the spool 15 will operate in exactly the same manner as the uppermost spool 10, to effect diversion of pressure fluid from its upstream through passage section 28 to either of its service passages 32 and 33, and to effect diversion of return fluid from the other service passage to the exhaust passage means. It should be observed, however, that the bottom spool 15 will function to actuate a hydraulic mechanism under its control even though one or more of the series spools 12, 13 or 14 occupies an operating position, as long as both of the parallel spools 10 and 11 at the top of the body are in their neutral positions.

The series spools described are designed to be readily interchangeable with the spools of a conventional series-parallel control valve like that disclosed in the aforesaid Tennis Patent No. 2,873,762 (FIGURE 9), to enable the series-parallel valve to be converted to series operation without requiring any change in the valve body.

Such a conventional series-parallel valve body can also be easily modified at the time its casting is made to adapt it partly for series operation and partly for parallel operation with conventional spools. In that case, it is only necessary to provide a cored feeder passage which parallels the through passage, such as the feeder passage 46 described herein, common to the bridge passages of adjacent parallel type spools but not communicable with the bridges of any series spools that may be located downstream from the parallel type spools.

Thus, the same basic valve body, with but minor changes made thereto during casting, is adaptable for parallel, series-parallel or series operation, or for different combinations thereof.

Figure 5:
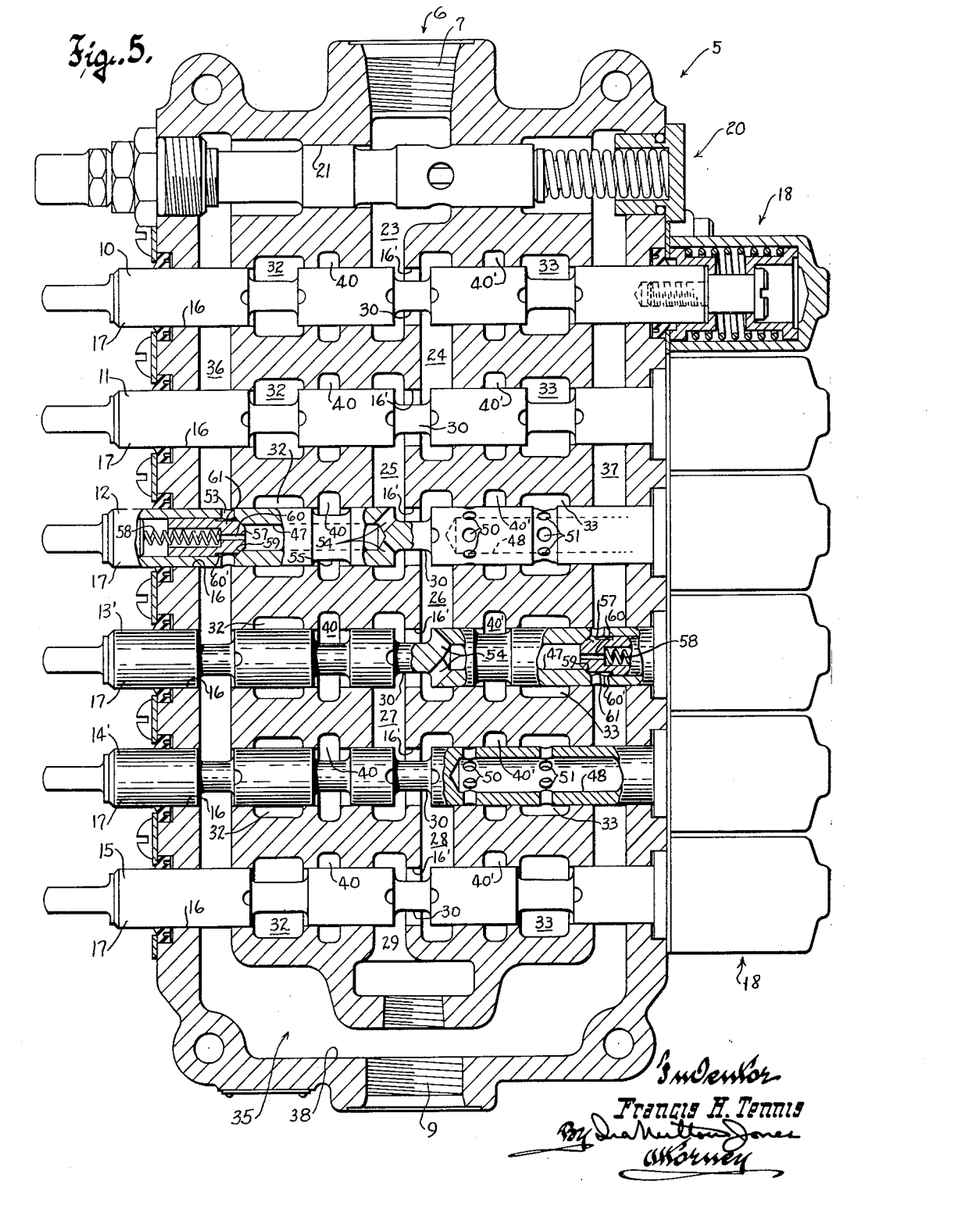
FIGURE 5 is a view similar to FIGURE 1, but illustrating a modified embodiment of the invention.
Figure 6:
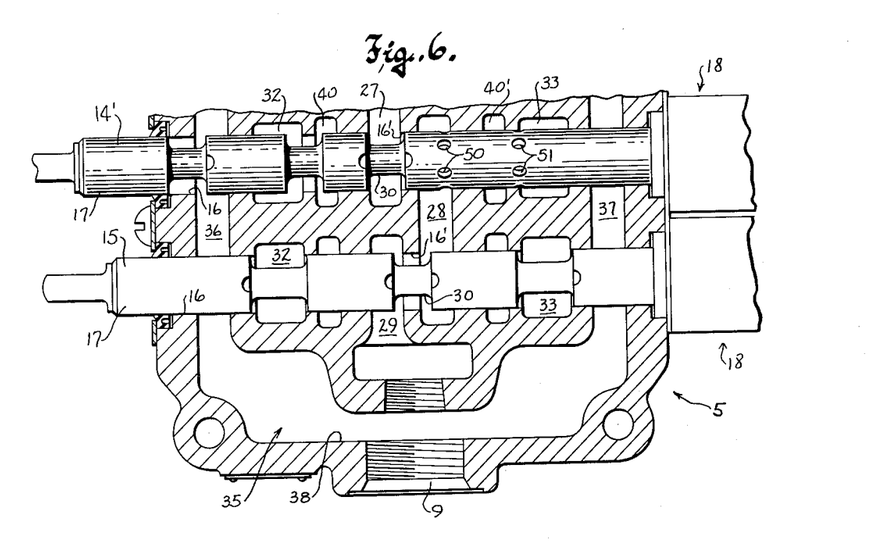
FIGURE 6 is a view of the lower portion of the valve shown in FIGURE 5, on an enlarged scale, showing one of the valve spools shifted to one of its operative position.
Figure 7:
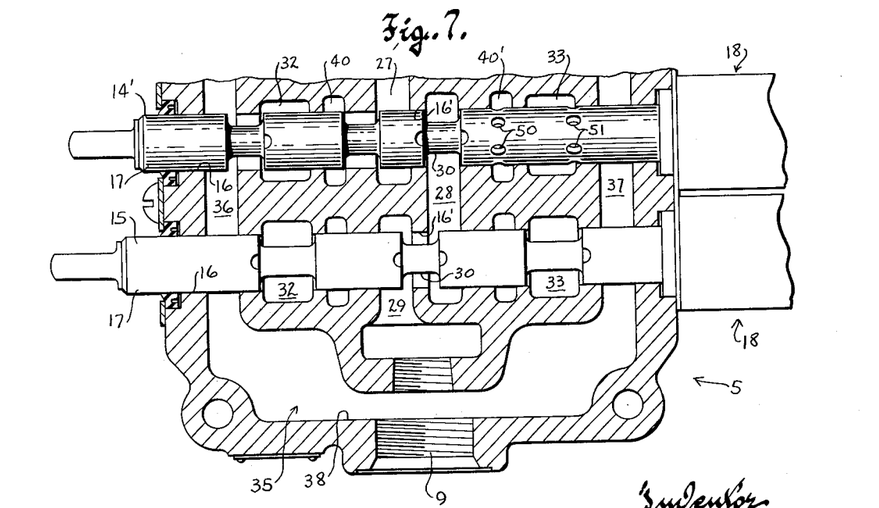
FIGURE 7 is a view similar to FIGURE 6, but showing said valve spool in its other operative position.

It is also possible to employ the same basic valve body to provide series operation of a pair of double acting hydraulic mechanisms when the spool for one of them is in one of its operating positions and conventional series-parallel operation of the mechanism when said spool is in its other operating position, as in the case of the valve spools 13′ and 14′ in the embodiment of the invention illustrated in FIGURES 5–7. Such an arrangement may have particular value in the operation of a double acting lift cylinder working against substantial gravity loads, wherein the return fluid from the cylinder may have substantial pressure during its load lowering stroke, even though the pump is very lightly loaded, but the use of fluid returning to the control valve during the lifting stroke of the cylinder would merely effect a corresponding increase in the load on the pump and thus afford no saving of power.

In the valve shown in FIGURES 5–7 the valve body 5 is in all respects identical to that previously described, and the three uppermost valve spools 10, 11 and 12, and the lowermost valve spool 15 are likewise identical in construction and function with the corresponding spools of the FIGURES 1–4 embodiment of the invention.

Each of the valve spools 13′ and 14′, however, provides for series operation of the spool or spools therebeneath when it is shifted to its left hand operative position (illustrated in FIGURE 6) and provides for conventional series-parallel operation when shifted to its right hand operating position (illustrated in FIGURE 7). Thus the right-hand portions of the valve spools 13′ and 14′ are respectively identical with the right hand portions of spools 13 and 14 in FIGURE 1, while their left hand portions may be solid but grooved to provide lands that are generally similar to those of conventional series-parallel and parallel spools 10, 11 and 15, although the specific land and groove arrangement is slightly different.

In the case of either spool 10, 11 or 15, when the spool is shifted to its left hand operating position, it diverts pressure fluid to the right service passage 33, and in its right hand position it sends pressure fluid to the left service passage 32. In the case of each of spools 13′ and 14′, however, shifting of the spool to its right hand operating position effects pressurization of its right hand service passage 33, while in its left hand operating position it communicates the leg 40′ of its bridging passage with its adjacent downstream section 27 of the through passage.

It will be observed that this situation, with respect to the orientation of the service passages that receive pressure fluid and return fluid also obtains in the valve illustrated in FIGURES 1–4, that is, the conventional spools 10, 11 and 15 direct pressure fluid to the left hand service passage when they are shifted to their right hand operating positions, and vice versa, whereas the series spools 12, 13 and 14 direct pressure fluid to the right hand service passage when in their right hand operating positions.

Because of the different orientation of the pressurized service passages in the operating positions of the spools, the left half of each of the spools 13′ and 14′ in FIGURE 5 has a somewhat different arrangement of lands and grooves than the conventional spools 10, 11 and 15, to provide the proper communication between the service passage 32 and the exhaust and bridging passage legs 36 and 40, respectively, in the respective operating positions of the spools 13′ and 14′.

From the foregoing description, taken together with the accompanying drawings, it will be readily apparent to those skilled in the art that this invention provides simple and inexpensive means for adapting a basic control valve body, of a type which had been hitherto limited to parallel or series-parallel service, for series operation with little or no change in the body of the valve.

What is claimed as my invention is:
1. In a slidable spool control valve:
   A. a body having
      (1) a pair of spool bores,
      (2) passages connecting with each of the spool bores and providing
         (a) through passage means extending from an inlet in the body to an outlet and
         (b) exhaust passage means communicating the bores with the outlet, one of said passage means having a pair of branches connected with each of the bores near the opposite ends thereof, and the other of said passage means being connected with each bore intermediate its connections with the first designated passage means and being arranged symmetrically in the body with respect to the first designated passage means.
      (3) a branched supply passage for each spool bore communicating with its bore at locations axially spaced to opposite sides of the connection of the bore with said other passage means and into which pressure fluid is diverted from the through passage means at the inlet side of the spool bore when a spool in the bore is shifted from a neutral position to either of two operating positions at which the spool blocks the through passage means, and (4) a pair of service passages for each spool bore, each connectable with one side of a fluid pressure operated cylinder, each opening from its spool bore at locations axially spaced from said through and exhaust passage means, and to either of which fluid from the adjacent branch of the branched supply passage is diverted when a spool in the bore is in one of its operating positions while return fluid from the other service passage can be diverted to the exhaust passage means by a spool in the bore which adapts the body for series-parallel operation of cylinders connected with the service passages of said bores, so that pressure fluid cannot flow to the spool bore that intersects the through passage means nearer its outlet end when a spool in the other bore is moved to one of its operating positions;

B. a check valve in the body for each spool bore, located remotely from its spool bore and controlling flow of fluid through the branched supply passage associated with its spool bore; and C. means adapting said valve body for series operation of cylinders connected with the service passages associated with said spool bores, said means comprising a spool in the spool bore that intersects the through passage means nearer its inlet end, which spool has (1) an internal passage located at one axial side of a solid intermediate portion of said spool, (2) an inlet port opening to said internal passage and which communicates with one of the service passage in one operating position of the spool, and (3) an outlet port by which the internal passage is communicated with the portion of the through passage means that leads toward the outlet from said spool bore when the spool is in its said operating position, so that return fluid from a cylinder associated with said spool bore is made available through the through passage means to the other spool bore, (4) said spool also having means operable in its said one operating position to block communication between said one of the service passages and the exhaust passage means.

2. The slidable spool control valve of claim 1, further characterized by the fact that said spool has two internal passages therein, one at each axial side of its solid intermediate portion, and each having an inlet and an outlet port, so that return fluid from a cylinder associated with the spool is made available through the through passage means to the other spool bore in each operating position of said one spool.

3. The slidable spool control valve of claim 1, further characterized by the fact that said means in the spool blocking communication between the service passage and the exhaust passage means comprises a movable valve member in said internal passage biased to a position normally blocking the internal passage intermediate its inlet and outlet ports but movable to an open position against its bias in response to the pressure of fluid entering the inlet portion of the internal passage in said one operating position of said spool to permit return fluid from said service passage to flow through said internal passage in the spool from its inlet to its outlet ports and thus to the through passage means.

4. The slidable spool control valve of claim 3, wherein said movable valve member comprises a plunger which is slidable axially in a cylindrical chamber in said spool, to which chamber said internal passage opens axially outwardly and which is coaxial with but larger in diameter than said internal passage and communicates therewith through an annular valve seat that is intermediate the inlet and outlet ports of said internal passage; and wherein said plunger has a reduced seat-engaging inner end portion located radially inwardly of the inlet port of said internal passage, and has a shoulder thereon which faces toward said valve seat and upon which pressure fluid entering the inlet port acts to unseat the plunger in said one operating position of said spool.

5. The control valve of claim 4, wherein said plunger has an axial pressure balancing passage therethrough communicating the valve chamber with said internal passage, to enable the plunger to remain in said closed position when its spool is shifted to its other operating position.

References Cited in the file of this patent

UNITED STATES PATENTS

| | | |
|---|---|---|
| 2,586,932 | Gardiner | Feb. 26, 1952 |
| 2,651,324 | Hodgson et al. | Sept. 8, 1953 |
| 2,856,960 | Stacey | Oct. 21, 1958 |
| 2,924,240 | Dolan | Feb. 9, 1960 |
| 2,965,133 | Rice et al. | Dec. 20, 1960 |